G. RADTKE.
EGG BAKER.
APPLICATION FILED APR. 9, 1910.
999,257.
Patented Aug. 1, 1911.
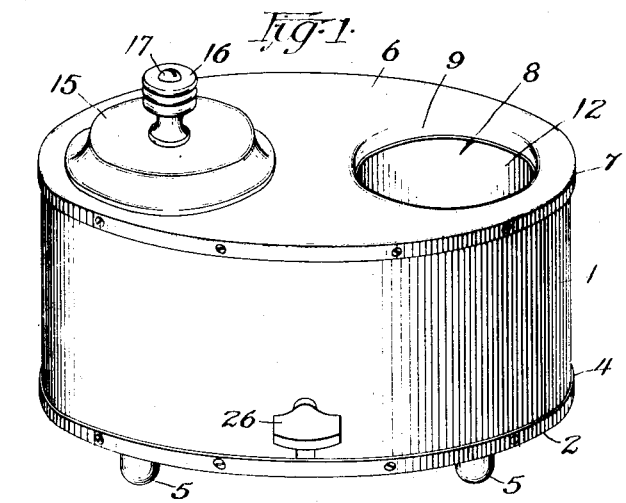
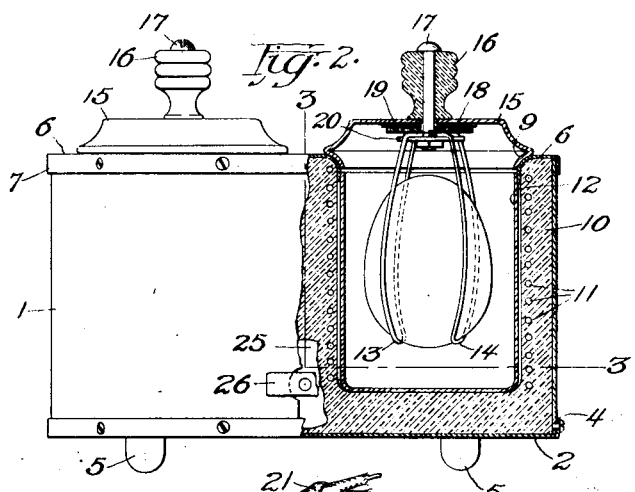
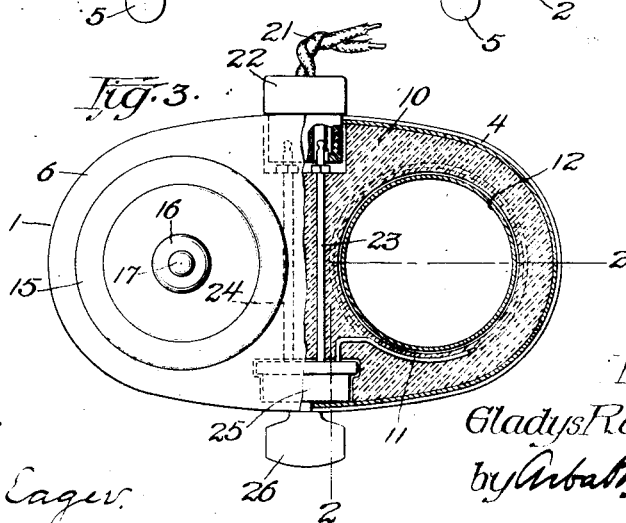

UNITED STATES PATENT OFFICE.

GLADYS RADTKE, OF CHICAGO, ILLINOIS.

EGG-BAKER.

999,257.

Specification of Letters Patent. Patented Aug. 1, 1911.

Application filed April 9, 1910. Serial No. 554,338.

*To all whom it may concern:*

Be it known that I, GLADYS RADTKE, a citizen of the United States, residing at Chicago, county of Cook, and State of Illinois, have invented certain new and useful Improvements in Egg-Bakers, of which the following is a specification.

The main object of the present invention is to provide an electrically operated heating device wherein an egg may be baked without fracture of the shell; and to provide means for supporting an egg within a heating device in such a way that the egg is evenly heated throughout, and is not subjected to the danger of fracture, either from expansion of the fluid parts of the egg, or because of localized heating or cooling.

A specific embodiment of this invention is shown in the accompanying drawings, in which—

Figure 1 is a perspective view showing a heating device adapted for the baking of two eggs simultaneously, the cover for one of the baking chambers being removed. Fig. 2 is an elevation partly in section along the line 2—2 of Fig. 3, and shows an egg in position within the baking chamber. Fig. 3 is a plan view partly in section along the line 3—3 of Fig. 2.

In the construction shown, the heating device comprises a sheet metal casing 1 of elliptical form, having a bottom 2, which has an upstanding flange 4. This bottom is mounted on insulating legs 5. The elliptical body 1 is provided with a cover 6, having a depending peripheral flange 7 with screws for holding it in place. This cover is provided with a pair of openings 8, each slightly larger than an egg. The metal edge around each opening is bent down to form a depending flange or shoulder 9.

Within the elliptical casing is a solid block of insulating material 10 molded to shape and fitting closely within the elliptical casing 1. This insulating block has two cylindrical chambers located directly below the apertures 8, and adapted to serve as baking chambers for eggs. A resistance conductor or wire 11 of suitable alloy is wound helically about each of these chambers, and serves as the means for heating the chambers. The wire may be introduced into the block of insulation before the latter has hardened, and may be set back from the surface far enough to insure good electrical insulation.

Within each chamber is a sheet metal cup 12, preferably of brass or copper, and pressed or spun from a single piece of metal so that it may be without seams or solder. This metal cup forms a lining for the heating chamber. The cup can be lifted out of the device for washing or cleaning, when desired.

As the means for supporting an egg within the cup of each heating chamber, I utilize a resilient support comprising a pair of resilient wire loops 13 and 14, bent to conform to the surface of an egg. These wires are of suitable steel or alloy, and of small cross section, and are adapted to retain their resiliency at the temperature to which they are subjected within the heating chamber. The wires are suspended from a sheet metal cap 15, provided with a porcelain handle 16 having a bolt 17, which passes down through a mica washer 18, and a pair of lavite disks 19 and 20. This bolt serves as clamping means for the ends of the egg-supporting wires and the mica and lavite insure good thermal insulation of the wires. The small cross section of the wires and their insulation from the metal cover insures for them a temperature substantially that to which the egg is subjected. This obviates any danger of subjecting the egg to localized heating or cooling at its points of support. Furthermore, the yielding nature of the supports allow for expansion and contraction of the egg when heated and cooled.

The electrical connections for the heating wire may be of the general character indicated in Fig. 3, where the flexible current supply conductors 21 terminate in a porcelain plug 22 of ordinary type adapted for insertion through a hole in the rear of the casing, there to make contact with a pair of rods 23 and 24, which run through to the front of the insulating block where there is a cavity or recess containing a double pole switch 25, with its operating handle 26 protruding through an opening in the front of the casing. The resistance coils for the two heating chambers may be connected in series, and may have suitable connection with this double pole switch.

When an egg is to be heated, it is slipped between the wire springs or loops 13 and 14, and then lowered into the heating chamber in such position that the egg is entirely out of contact with the sides or bottom of the copper cup 12. The current is then turned on either by inserting the porcelain plug 22, or by turning the switch handle 26, and this current serves to heat the baking chamber to such a temperature that the egg is speedily cooked. It is feasible to bake the egg in this way in two to four minutes. Eggs so baked are relatively dry and are particularly suited to the needs of invalids. If a somewhat slower baking is desired, it may be effected by leaving the current on only long enough to thoroughly heat the chamber and its contents, then opening the switch and allowing the egg to cook slowly at the gradually decreasing heat of the chamber.

Either direct or alternating current may be used in the heater winding, but when alternating current is used, the copper cup serves as a short circuited secondary, and carries current induced therein by the inductive action of the winding, this current serving in a measure directly to heat the copper cup.

What I claim as new, and desire to secure by Letters Patent of the United States is—

1. In an egg baker, the combination of a metal cup, means for heating said cup to baking temperature, means for supporting an egg within said cup and out of contact with the walls thereof, said supporting means having small capacity for conducting heat to or from the supported egg, and means for thermally insulating said supporting means.

2. In an egg baker, the combination of a metal cup, means for heating said cup to baking temperature, a cover for said cup, a plurality of loops of resilient wire of small cross section supported by said cover and adapted to support an egg within said cup and out of contact with the walls thereof, and means for thermally insulating said wire loops from said cover.

3. In an egg baker, the combination of a heating chamber adapted to receive an egg, means for heating said chamber to baking temperature, a cover for said chamber, loops of resilient wire of small cross-section supported by said cover and adapted to support an egg within said chamber and out of contact with the walls thereof, and means for thermally insulating said wire loops from said cover to limit the quantity of heat conducted by said wires.

In witness whereof, I have hereunto set my hand this 4th day of April, A. D. 1910.

GLADYS RADTKE.

Witnesses:
DAISY M. EAGER,
CHERRE B. DAVIS.